United States Patent
Doshi et al.

(10) Patent No.: US 8,214,471 B2
(45) Date of Patent: Jul. 3, 2012

(54) SYNCHRONIZING INFORMATION THROUGH PROFILE MANAGEMENT BETWEEN A HOST SYSTEM AND A MOBILE DEVICE

(75) Inventors: Dinesh Doshi, Union, NJ (US); Tor Andre Johansen, Osio (NO)

(73) Assignee: w2bi, Inc., Union, NJ (US)

( * ) Notice: Subject to any disclaimer, the term of this patent is extended or adjusted under 35 U.S.C. 154(b) by 172 days.

(21) Appl. No.: 12/138,903

(22) Filed: Jun. 13, 2008

(65) Prior Publication Data

US 2008/0313313 A1 Dec. 18, 2008

Related U.S. Application Data

(60) Provisional application No. 60/943,742, filed on Jun. 13, 2007.

(51) Int. Cl.
*G06F 15/16* (2006.01)
(52) U.S. Cl. .................................. 709/221; 709/220
(58) Field of Classification Search .................. 709/221; 707/120
See application file for complete search history.

(56) References Cited

U.S. PATENT DOCUMENTS

| | | | |
|---|---|---|---|
| 6,272,545 B1 * | 8/2001 | Flanagin et al. | 709/228 |
| 6,754,470 B2 * | 6/2004 | Hendrickson et al. | 455/67.11 |
| 7,187,660 B2 * | 3/2007 | Shell et al. | 370/254 |
| 7,349,710 B2 * | 3/2008 | Kaplan et al. | 455/466 |
| 2002/0129107 A1 * | 9/2002 | Loughran et al. | 709/206 |
| 2003/0101329 A1 | 5/2003 | Lahti et al. | |
| 2005/0055397 A1 * | 3/2005 | Zhu et al. | 709/200 |
| 2006/0004922 A1 | 1/2006 | Lahti et al. | |
| 2007/0087765 A1 * | 4/2007 | Richardson et al. | 455/466 |

* cited by examiner

*Primary Examiner* — Bunjob Jaroenchonwanit
(74) *Attorney, Agent, or Firm* — McHale & Slavin, P.A.

(57) ABSTRACT

A system for enabling control and managing the assets by synchronizing information between a host system server and a mobile client device is disclosed. Control of the mobile client devices from remote locations enables an administrator to provide specific profiles for the mobile devices. These profiles are consistent and ensure that the user can perform all of the required tasks. The system also includes a multi-level security mechanism. The security provision maintains control of the hardware (mobile device) and the information stored thereon. The administrator also controls the distribution of applications and services to the mobile device, including restoring information which may have become lost.

12 Claims, 2 Drawing Sheets

Process flow

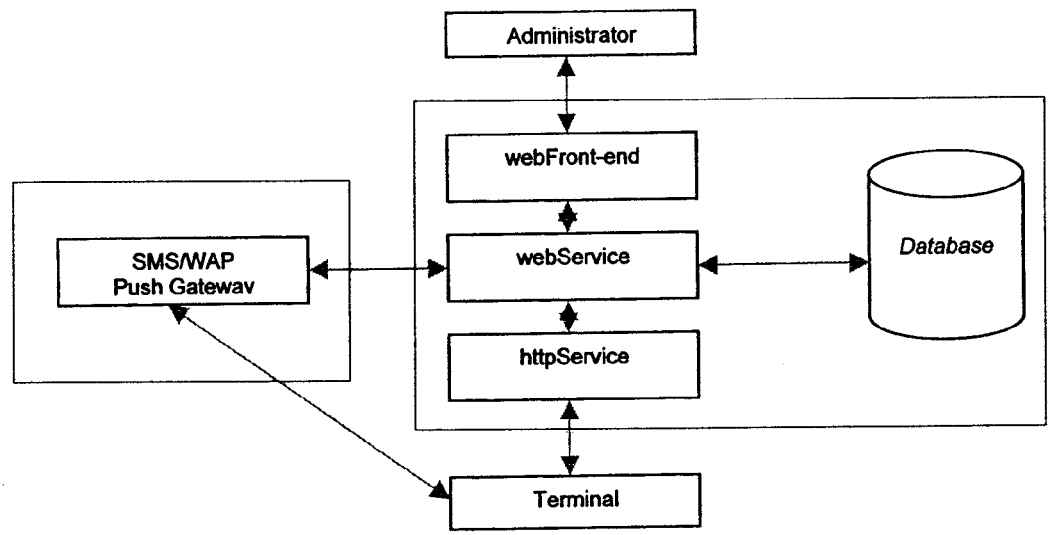
Figure 1: Functional Block Diagram
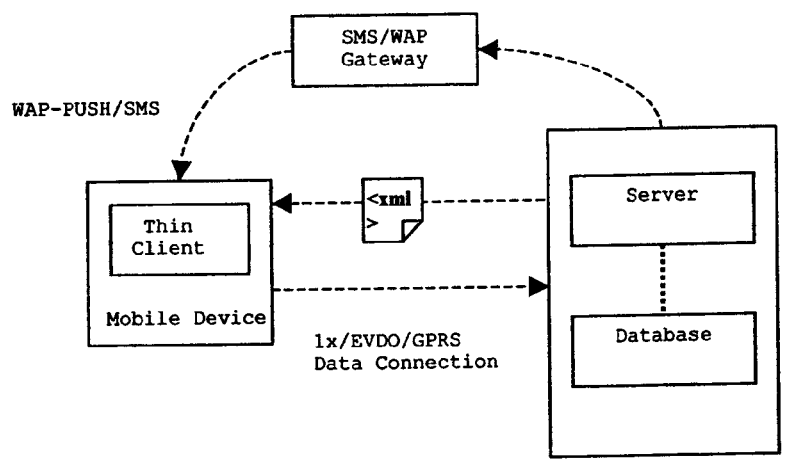
Figure 2: Basic Communication Mode

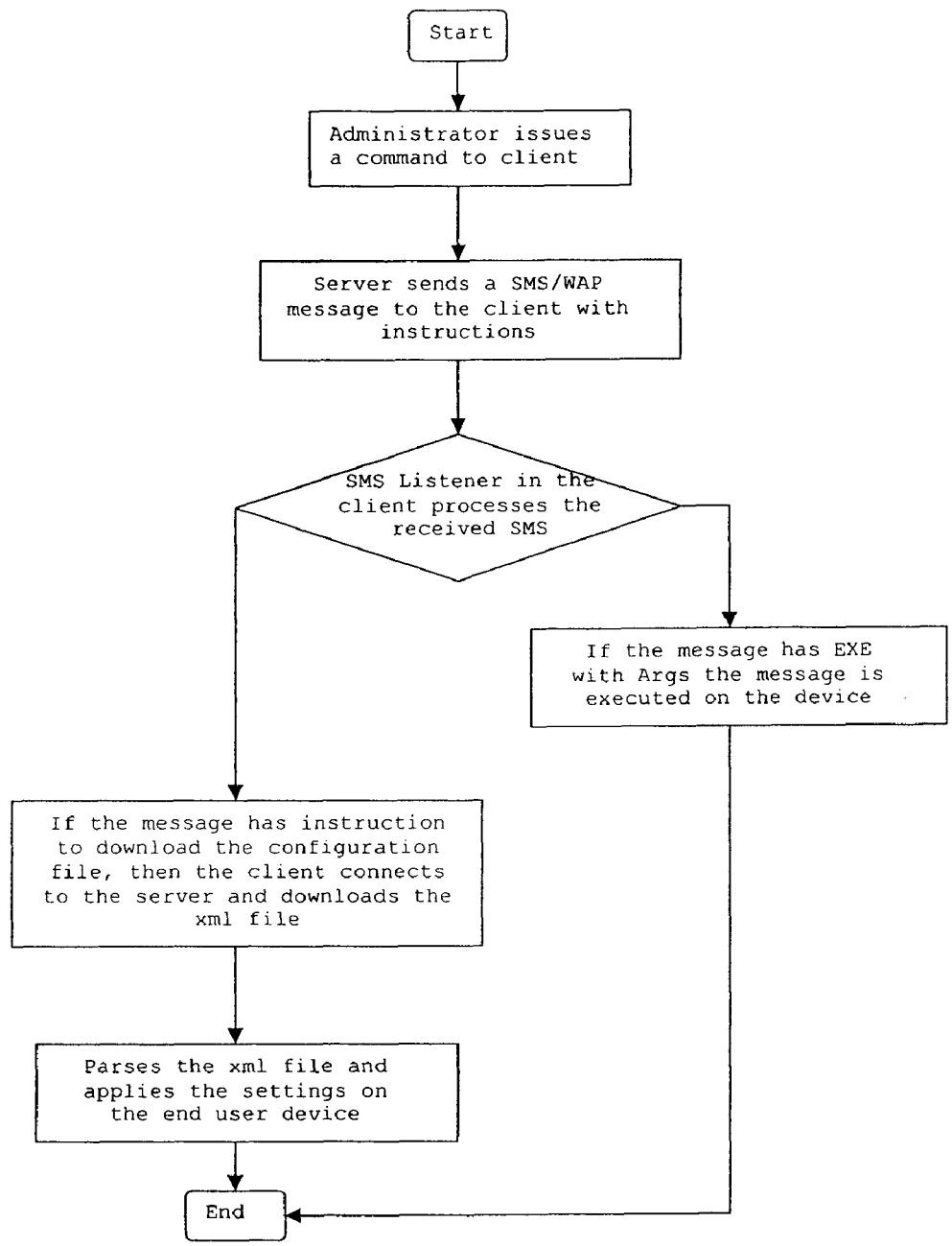
Figure 3: Process flow

SYNCHRONIZING INFORMATION THROUGH PROFILE MANAGEMENT BETWEEN A HOST SYSTEM AND A MOBILE DEVICE

PRIORITY CLAIM

This invention claims the priority date of U.S. Provisional Patent Application No. 60/943,742 filed Jun. 13, 2007 entitled Synchronizing Information Between a Host System and a Mobile Device.

FIELD OF INVENTION

The present invention relates to mobile wireless communication devices and, in particular, to a profile sharing and management program between mobile wireless communication devices and a host system.

BACKGROUND OF THE INVENTION

Security enabled devices are increasingly deployed throughout the use of enterprise networks, rather than just at the perimeter. It has become increasingly difficult for a security team of any enterprise to map organizational security policies to the detailed configuration of those devices; in addition to ensuring that the configurations remain constant while needs evolve.

Present systems for installing profiles on mobile wireless communication devices typically consist of a set of preinstalled "profiles" which are normally installed by the service provider of the device when the device is purchased and first placed into service. The owner or user of the device can then download other software and features to individually customize their device to their specific needs. This is satisfactory when the mobile devices are used for personal use. However, when the mobile devices are used for business, the profiles of each device should be the same so that there is consistency between the mobile devices. Also, it is critical that all of the mobile devices employed by a business are able to perform certain functions and run specific software.

Thus, there is a need for a flexible, end-to-end solution to ease the process of securing and managing devices within a corporate network, while providing a more secure, single-point access for applications and corporate data.

SUMMARY OF THE INVENTION

The invention defines a system and a method for mobile client device asset management. The system consists of a Data Base with web interface to manage mobile client device information and a method of deploying this information to the mobile client device(s) using managed profiles that could be deployed to the device(s) either via a push from the data base or a pull from the mobile device. Profiles could be assigned to a group of devices, a sub-group of devices, or an individual device. (For example if a user needs a replacement device, a simple pull of the profile from the data base will restore the same services on the replacement device as were present on the lost device). The profile based push or pull method of creating and updating services on the mobile device is a differentiator with other systems that use only push methods and this gives the power to the user of the device.

The profile based device management extends to mobile device desktop management and service window branding. The client residing on a mobile device interprets different profiles and creates different desktops populated with services and customized information derived from the profile. The invention uses a multi-layered approach to profile building, allowing, for example, to present the same carrier information across all the devices, while customizing enterprise information to a group of devices, allowing service window branding at the enterprise or a user group level. The invention allows dynamic update of the front screen with new services.

Thus, an objective of the invention is to disclose a simple method of managing a mobile phone and allow customized provisioning for enterprise network uses and to store personal settings of every user in an enterprise network.

Another objective of the invention is to disclose Mobile Phone Management that provides ease in distributing new services/applications and provides ease in restoring critical information on the phone.

Another objective of the invention is to disclose a method of safeguarding against the loss of a mobile phone and the stored information.

Still another objective of the invention is to disclose a method of Mobile Phone Management that makes services easy to access from a desktop computer.

Yet still another objective of the invention is to allow an end-user to create a custom branding and customization of the end-user device.

Another objective of the invention is to disclose a Mobile Phone Management program to give the user easy navigating access for all the applications on the mobile device.

Still another objective of the invention is to disclose a better inventory and reporting management process providing IT professionals with vital information about the status of a managed device.

These and other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 1 depicts a functional block diagram;
FIG. 2 depicts the basic communication mode; and
FIG. 3 depicts a process flow diagram.

DETAILED DESCRIPTION OF THE INVENTION

The instant invention is a device management solution to distribute software, configure and manage device inventory in a complex organizational environment. The mobile "client device" and host computer "server" communicate via SMS or HTTP mechanism. Device bonding is first performed allowing the client device to communicate with the server and, in particular, establish and verify the client device identity. The server sends a command to the client device, requesting the client device identity. After the client device sends the requested information to the server, the server compares its data with the client device provided data. Verification of the identity of the client device by the server permits access to the server for further communication.

FIG. 1 depicts a functional block diagram. A client-server architecture is used between the client device and the server for communicating over a wireless network. A client-server server application is a distributed system that constitutes of both client and server software. A client software or process may initiate a communication session, while the server waits for requests from the client. Client server communication mode between the client and server is by SMS/WAP protocol or by making a Data Connection. Instructions to the client will be in the form of an XML file or text data in the SMS message itself.

FIG. 2 depicts the basic communication mode. The Administrator issue commands to the client device. Once the command is sent in the form of SMS or WAP PUSH the client device parses the message and executes accordingly. The SMS/WAP PUSH may contain EXE with Arguments for file download, Asset Management etc or instruction to download the XML file from the server to configure the device for Exchange, Browser Favorites, Data Settings, VPN settings etc.

FIG. 3 depicts a process flow diagram. Profile management provides the ability to configure and manage user profiles like custom desktop settings, browser favorites, data settings, custom configurations and the like. The current invention provides a single point of Profile Management to store personal settings of every user in an enterprise network. The client and the server communicate with each other through any of the existing modes like SMS/WAP or HTTP based data connection. The current invention has options for both PUSH and PULL based Profile Management.

The client will be notified by a command to pull the profile from the server. Based on the type of a command the client queries the server database and downloads the profile. The client processes the downloaded file, which is in an xml format, parses the xml file and applies the appropriate settings on the device based on the profile.

The configuration manager has the ability to configure group of devices over the air through bootstrapping. The application allows configuring the following on the end user device: Data Settings, VPN Settings, Exchange Settings, POP/IMAP3 Settings, Browser Favorites, and Host Settings.

The server sends a command to the client instructing it to download the configuration settings from the server. The client then downloads the configuration settings in the form of xml file, parses the file and then applies the settings on the end-user device.

Static applications (Any Document like Word, Excel, PPT etc. . . . ) or non-static applications (Installation packages, Configuration Settings etc. . . . ) to be pushed to the managed end-user device. The Server issues a command to the client instructing it to connect to the server to download the packages from the server repository. The client downloads the package on to the device. If the package is a non-static application then the client first installs the package on the end-user device, if not already installed and then executes the same.

The current invention allows the end-user to create a custom desktop. The custom desktop allows the branding and customization of the end-user device. It gives the user easy navigating access for all the applications on the device.

The process disclosed provides IT administrators with an ability to easily manage client devices. Administrators have access to a broad range of information including the following: Operating system and Version; Device Model, make, ID, and language; Hardware ID; Device Hardware specifications; and storage information; Call History; Software Applications installed on the device; and Battery Status.

Asset Management has three modes of device status check with and without response back from the client.

Ping—This is to check if the terminal is alive (turned on and connected to the operator network). When a request device assets operation is issued by the administrator, a SMS/WAP-push message is sent to the target terminal(s), requesting the client to send an SMS relayed back to the server to notify that it's "alive".

Info—The terminal reports back available device information.

Info and File structure—The client reports back available device information and the file structure of the device. When a request device assets operation is issued by the administrator, a SMS/WAP-push message is sent to the target terminal(s), requesting the terminal client to collect information from the terminal, connect to the server and post the information back to the server (using HTTP).

Policy Enforcement: Security administrators typically consider "authorization" in the context of user identities, which are verified via passwords or randomly generated codes. Once identity has been validated, it's used to establish appropriate levels of access to computers, network resources and information. People with networking and Web server experience may go so far as to include certificates in their understanding of "authentication" and authorization, since IPsec and SSL/TLS both rely on certificates for validation of machine identities. The present invention allows the server to push company certificates for policy enforcement.

The Server issues a command to the client instructing it to connect to the server to download the certificates from the server certificate repository. The client downloads the certificate on to the device.

Security: The present invention has two features to protect the end user device data.

Lock: Remote Lock service provides the ability for an administrator to immediately lock the end user device. Once the command is issued the devices resets and asks for the password to unlock.

Wipe: Remote wipe service provides the ability for an administrator to immediately wipe data from the end user device.

Both Lock and Wipe service is available for the end user wherein the user need not wait for the Administrator to issue these commands. Lock and Wipe commands can be issued by sending an SMS from one mobile device to another, provided the user knows the password of the device that needs to be locked or wiped.

For example: User 1 sets a Lock/Wipe Password on the client device. The user can then send an SMS to the device from any other device and LOCK or WIPE the device contents using the command with the appropriate password.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

All patents and publications mentioned in this specification are indicative of the levels of those skilled in the art to which the invention pertains. All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the stated claims or objectives.

What is claimed is:

1. A method of synchronizing information between a host system server and a mobile client device within an enterprise or customer network comprising the steps of:
    establishing a SMS OR WAP protocol communication link between a first client device and a host system server,
    forwarding an identification means from said first client device to said host system server and verifying said identification means, said host system server waiting for a request from said first client device, said first client device contains personal settings;
    forwarding said personal settings from said first client device to said host system server;
    initiating a communication session by said first client device;
    downloading of commands in the form of SMS or WAP PUSH containing an EXE file with Arguments for file download of an XML file of a managed profile received from said host system server;
    parsing the commands and executing said commands accordingly to configure said first client device for Exchange, Browser Favorites, Data Settings, or VPN settings;
    providing a single-point access of an asset management for restoring said personal settings on said first client device or on a second client device;
    sending instructions to said second client device in the form of text data within a SMS message to configure said second client device for Exchange, Browser Favorites, Data Settings, or VPN settings;
    wherein said first and second client device are configured to contain customized software applications that synchronizes with said host system server and updates said identification means; and
    wherein said first client device personal setting is restored on said first client device or said second client device by receiving said stored personal settings, said personal settings defined passwords, software applications, emails, SMS messages, contact lists, and calendars, as well as display brightness settings, sound volumes, associated ring tones, sync options, date and time, keyboard settings, international settings, language selection, mail settings, caller id settings, call waiting settings, call forward settings, voice mail passwords, SMS settings, custom desktop settings, browser favorites, data settings, and custom configurations.

2. The method of synchronizing information between a host system and a mobile client device according to claim 1 wherein said commands are used to configure and manage custom desktop settings, browser favorites, data settings, and custom configurations.

3. The method of synchronizing information between a host system and a mobile client device according to claim 1 further comprising the steps of:
    notifying to the client device to download a profile file from said host system server in an xml format;
    parsing said downloaded profile file;
    applying appropriate settings on the client device based on said downloaded profile file.

4. The method of synchronizing information between a host system and a mobile client device according to claim 3 further comprising the steps of: storing personal profile settings of each user in an enterprise network in said host system server providing a single point of Profile Management.

5. The method of synchronizing information between a host system server and a mobile client device according to claim 1 wherein including the step of sending instructions to the client device in the form of a file download of an XML file to configure the client device.

6. The method of synchronizing information between a host system and a mobile client device according to claim 1 wherein said step of downloading is to a group of client devices through bootstrapping, said downloading selected from the file of: Data Settings, VPN Settings, Exchange Settings, POP/IMAP3 Settings, Browser Favorites or Host Settings.

7. The method of synchronizing information between a host system and a mobile client device according to claim 1 wherein said step of downloading is a static application pushed to said client device.

8. The method of synchronizing information between a host system and a mobile client device according to claim 1 wherein said step of downloading is a non-static application pushed to said client device, said non-static application installed by an end-user and said client device executing the non-static application.

9. The method of synchronizing information between a host system server and a mobile client device according to claim 1 including a ping status check wherein SMS/WAP-push message is sent to a client device requesting the client device to send a SMS relayed back to said host system server to notify that available operation.

10. The method of synchronizing information between a host system server and a mobile client device according to claim 1 including an information status check, said information status check includes a ping; wherein said client device reports available device information; wherein said available device information consisting of Operating System and Version; Device Model, make, ID and language; Hardware ID; Device Hardware specifications; and storage information; Call History; Software Applications installed on said client device; and Battery Status; wherein a terminal is turned on and connected to an operator network.

11. The method of synchronizing information between a host system server and a mobile client device according to claim 1 including an information and file structure status check wherein a SMS OR WAP-push message is sent to the client device requesting the client device to collect information and communicating with the host system server by HTTP to post information collected.

12. The method of synchronizing information between a host system server and a mobile client device according to claim 1 including the step of policy enforcement by allowing said host system server to push a company certificate to an authorized client device.

* * * * *